2,702,635

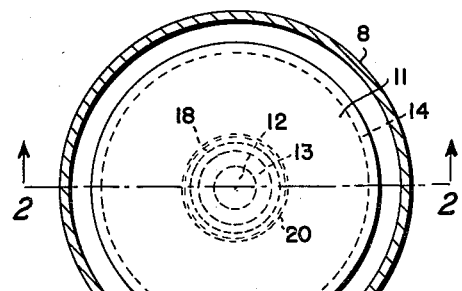
FIG. 1.
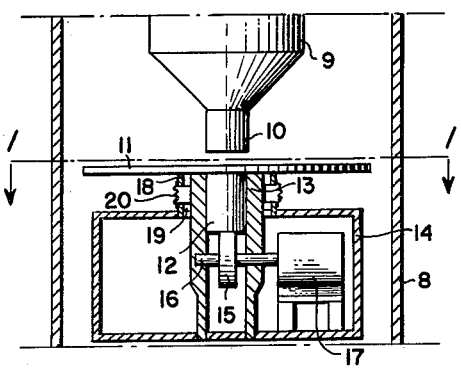
FIG. 2.
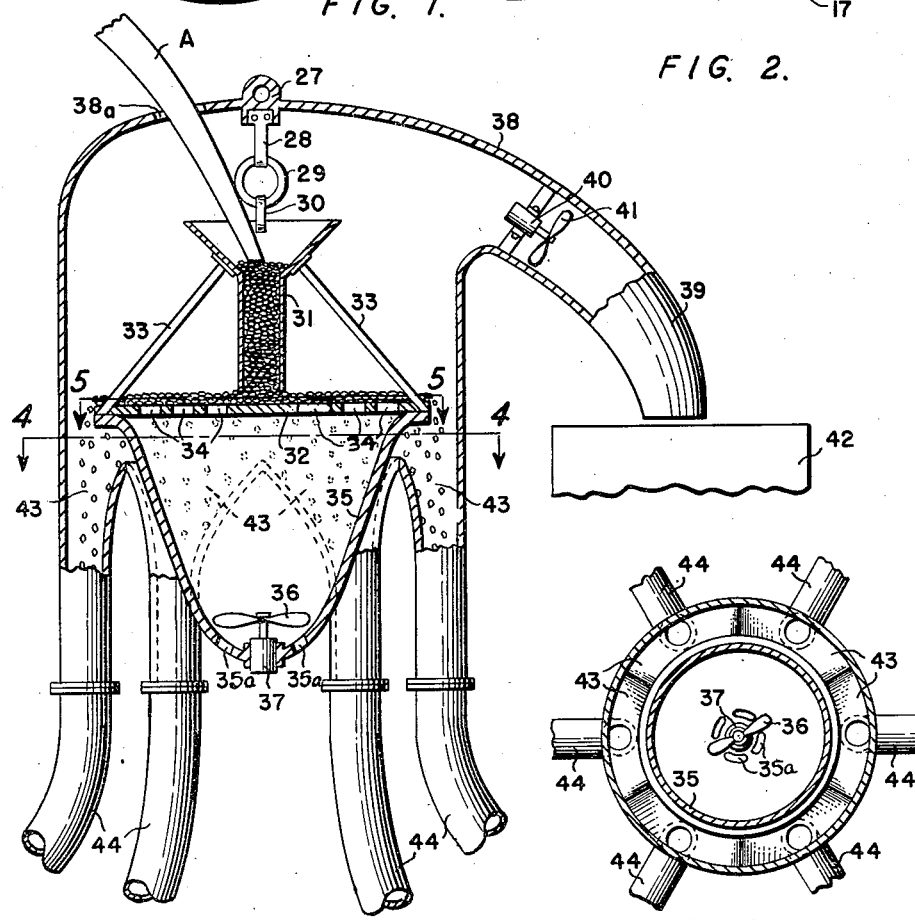
FIG. 3.
FIG 4
INVENTOR.
WILLIAM M. BOWEN III
BY
Ira L. Nickerson
ATTORNEY Feb. 22, 1955   W. M. BOWEN III   2,702,635
MATERIAL HANDLING
Filed Feb. 27, 1951   2 Sheets-Sheet 2
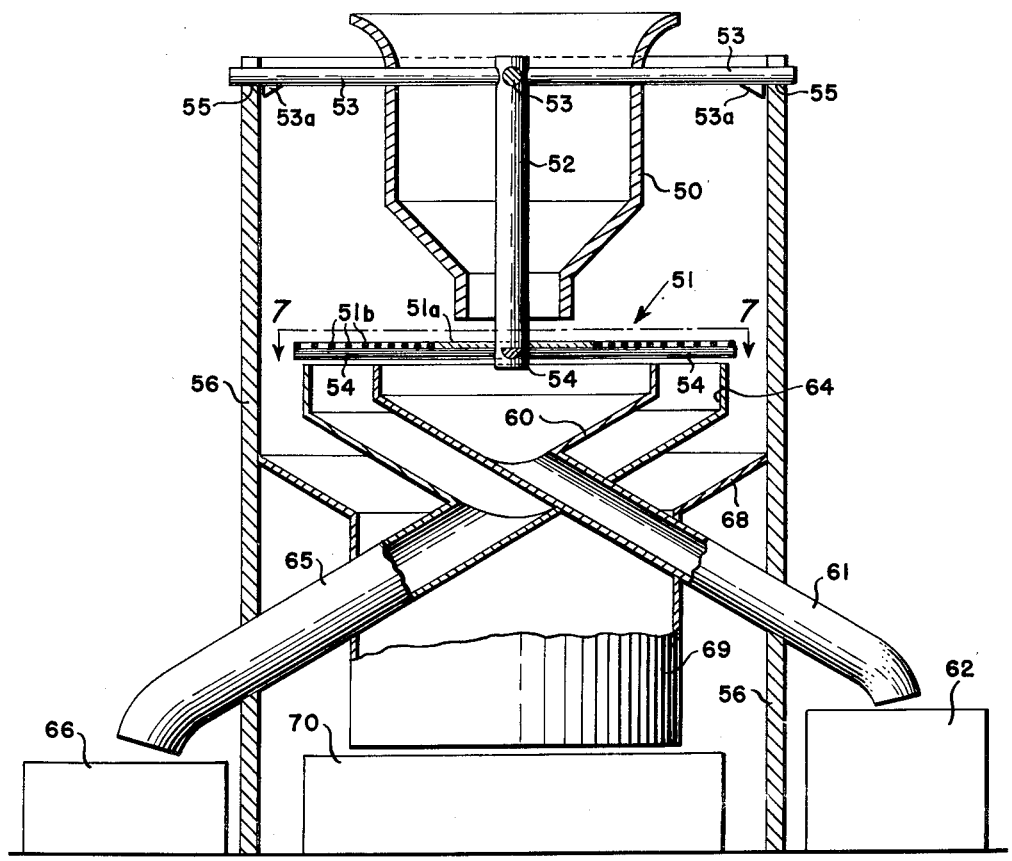
FIG. 6.
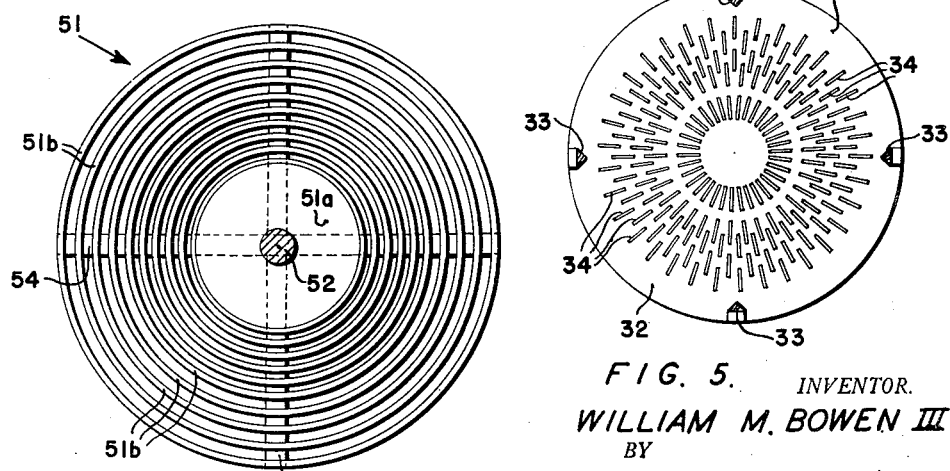
FIG. 7.
FIG. 5.
INVENTOR.
WILLIAM M. BOWEN III
BY
Ira L. Nickerson
ATTORNEY United States Patent Office 2,702,635
Patented Feb. 22, 1955

MATERIAL HANDLING

William M. Bowen III, Chester, Pa., assignor to Eugene J. Houdry, Ardmore, Pa.

Application February 27, 1951, Serial No. 213,019

2 Claims. (Cl. 209—466)

This invention relates to the bulk handling and processing of materials, particularly solids in discrete or particle form, including bits, crushed materials, shaped or molded pieces, etc. It is concerned with the movement and distribution of materials, also with the separation of the same into streams or batches which may be of the same or different composition. It also has to do with such operations as the sizing or screening of bulk materials, the cleaning and winnowing of grains, etc.

One object of the invention is to provide for uniform distribution of solids in discrete or particle form. Another object is to dispose such solids in a layer of substantially uniform thickness. Another object is to feed additional material into the layer in an automatic manner. Another object is to subject the solids while in layer arrangement to additional treatment. Another object is to effect movement of the solids radially from a source of supply of additional solids while the solids are still in layer arrangement. Another object is to effect screening or sifting of the solids while in the layer arrangement. Still other objects will be apparent from the detailed description which follows.

In its broadest aspect the invention consists in discharging the material upon a horizontally mounted support and causing the support to vibrate so that the material spreads out in the form of a layer of substantially uniform thickness and moves or flows to and over the edge of the support to be distributed as desired. While spread out upon the support in a layer it may be subjected to various forms of treatment: for example it may be screened, may have dirt and other foreign matter removed, may be divided into batches which vary in the sizing of the material. For such treatment of the material the support will be apertured as desired or required, as by means of holes or by slots running radially or circumferentially. Apparatus for practicing the invention may take a wide variety of forms and may be of fixed or of portable type.

In order to illustrate the invention and the manner of its use concrete embodiments of apparatus for carrying out the described process are shown in the accompanying drawings, in which:

Fig. 1 is a transverse sectional view on the line 1—1 of Fig. 2 showing in plan one form of support for the bulk material;

Fig. 2 is a vertical sectional view on the line 2—2 of Fig. 1 showing the upper end of a storage vessel or the like with the feed hopper and support therein in elevation;

Fig. 3 is an elevational view partly in vertical section of a portable embodiment of the invention;

Fig. 4 is a transverse sectional view on the line 4—4 of Fig. 3;

Fig. 5 is a fragmentary sectional view on the line 5—5 of Fig. 3 showing the upper face of the support;

Fig. 6 is a vertical sectional view with certain parts in elevation and partly cut away of a further modification of the invention; and Fig. 7 is a fragmentary sectional view on the line 7—7 of Fig. 6 showing the support in plan.

Figs. 1 and 2 show the upper portion of a storage vessel of any desired type, as for example a tower for storing grain or the like, a storage chamber or even a still for catalyst in granular or pellet form, etc. As indicated, the portion of the storage vessel which is shown has an annular wall 8 and within this wall is feeding and distributing apparatus of the present invention. A hopper 9 for the bulk material extends into the upper portion of vessel 8, and its lower open end 10 is spaced a suitable distance centrally above the upper flat face of a horizontally disposed support or table 11. The latter has a solid central cylindrical boss 12 projecting from its lower face and slidably received with a close fit in a bearing sleeve 13 forming a part of an enclosure 14 beneath support 11. Boss 12 rests upon a wheel 15 fixed to a shaft 16 having bearings in the lower portion of sleeve 13. The wide face of wheel 15 has serrations or is otherwise roughened so that when wheel 15 is rotated, as by electric motor 17 or other prime mover mounted within enclosure 14, horizontal support or table 11 is vibrated or given a slight but rapid up and down movement. This vibratory movement causes the bulk material deposited on support 11 by hopper 9 to spread out upon the upper surface of support 11 and to move or flow away from the lower end 10 of hopper 9 in the form of a layer, the thickness of which is determined by the spacing of delivery end 10 from support 11, the movement of the bulk material radially on the upper face of support 11 continuing so long as support 11 is vibrated by wheel 15, the bulk material moving to and falling off the circular edge of support or table 11 to be distributed within vessel 8. By preference enclosure 14 is sealed to prevent dust and grit from reaching motor 17 and the bearings of boss 12 and shaft 16. To this end an annular flange or ring 18 is provided on the under side of support 11, also a complementary flange or ring 19 extending upwardly from enclosure 14, the space between the two flanges being spanned and sealed by a flexible collar 20 of canvas or other suitable fabric which may be impregnated with a sealing compound such as rubber, drying oils, etc., which will render collar 20 impervious to liquids as well as solids. When vessel 8 is used as a storage chamber for hot bulk material such as a catalysts, or when vessel 8 is utilized as a reaction chamber or still, the prime mover or motor 17 for effecting agitation of support or table 11 will be mounted outside of the storage vessel 8, rather than inside as shown in Fig. 2, and actuating shaft 16 will be extended to project through wall 8.

Figs. 3, 4 and 5 illustrate portable apparatus for filling large storage chambers such as the holds of ships, etc., as well as for cleaning the bulk material which is fed through the apparatus. As shown in Fig. 3, the apparatus is supported or suspended from a block 27, the block being formed with a ring to receive a hook, not shown, suspended from a crane or other hoisting device. Block 27 has a depending strap 28 terminating in a ring 29 through which passes a bail 30 secured to opposite sides of the flared mouth of hopper 31, the lower open mouth of which is spaced from the center of annular support or table 32. The latter is attached to and supported from hopper 31 by a plurality of rods 33, four being shown, the lower ends of these rods being triangular in section (Fig. 5) at the points where they are attached to support 32, as by welding. Support 32 is suitably apertured by holes or slots of smaller size than the grain or other bulk material which is to be handled. In the form shown in Figs. 3 and 5 support 32 is provided with a multiplicity of narrow slots 34 which are radially disposed outwardly from the central portion of the support upon which the bulk material will directly fall from the open mouth of hopper 31. Attached to and depending from the under side of support 32 is an enclosure or skirt 35, which is generally conical in shape as shown (Fig. 3). Within enclosure 35 at its lowermost end is an upwardly directed impeller or fan 36 to be driven by suitable means, such as a motor 37 mounted at the apex of the enclosure. Enclosure 35 is provided with a series of openings 35a therethrough adjacent motor 37 for the ingress of air which will be driven by impeller 36 upwardly within skirt or enclosure 35 and through the apertures, such as slots 34 in support 32, to dislodge dust, dirt, chaff or other foreign matter from the grain or other bulk material fed upon support 32 in layer arrangement from hopper 31. Vibration of support 32 to cause the bulk material to move across the upper surface of the latter in layer arrangement is advantageously effected by providing motor 37 with an unbalanced rotor.

In order to carry away the dirt and other foreign matter dislodged from the bulk material by impeller 36, the feeding unit, which includes hopper 31, support 32, and skirt 35 and is suspending freely from ring 29 by bail 30, is enclosed by a casing 38 which is rigidly attached to block 27. The upper portion of casing 38 is formed with a laterally extending downwardly tapered outlet 39 forming a spout, the latter having suitably mounted therein a motor 40 driving an impeller or fan 41 to serve as an aspirator for the upper portion of casing 38 and continuously to discharge into a suitable receptacle such as 42 the dirt and chaff driven out of the bulk material by impeller 36. For the distribution of the cleaned or winnowed grain or other bulk material falling from the edge of support 32, a series of funnels 43 (Figs. 3 and 4) are provided within the lower end of casing 38 and beneath the outer edge of support 32, each such funnel terminating in or being attached to a distributing pipe 44. In the form of the invention shown, six such funnels and distributing pipes are illustrated (Fig. 4), each funnel receiving bulk material from one-sixth of the periphery of support 32.

The bulk material may be fed into hopper 31 by inserting a spout A through opening 38a in the upper part of casing 38. By making hopper 31 with a wide flare at the top there is room for inserting spout A within the hopper without interfering with the free suspension of the distributing unit comprising hopper 31, support 32, and depending skirt 35. Also by locating the lower end of spout A at about the base of the flared portion of the hopper, an automatic stop is provided for the flow of grain or other material through spout A as soon as the bulk material fills hopper 31 to and slightly above the end of spout A. In this manner overflow and spilling of bulk material upon support 32 at points other than the center is avoided, and the support hangs freely in a horizontal position. Fig. 3 illustrates the feeding of grain and the layer arrangement of the same as it moves across support 32 and falls into the series of funnels 43 for distribution by pipes 44.

The modification shown in Figs. 6 and 7 provides for dividing bulk material such as ore, crushed rock, coal, etc., into batches which have been screened and sized. The distributing apparatus, as in the modification shown in Fig. 3, is in the form of a unit, the hopper 50 and support 51 being attached together by a frame comprising a central post 52, the upper end of the post having diametrically opposed rods 53 extending therefrom and through the upper portion of hopper 50. The lower end of post 52 is provided with similar rods 54 extending beneath support 51 whereby hopper 50 and support 51 are maintained in fixed relation to one another. Rods 53 are of greater length than rods 54 and are received in sockets 55 therefor in the annular wall 56 of the apparatus, stops 53a being provided on the under side of rods 53 to maintain the distributing unit in a central position within the enclosure formed by wall 56. As indicated in Fig. 7 support 51 has an imperforate central portion 51a upon which the bulk material from hopper 50 will directly fall. Outwardly from the imperforate central portion 51a support 51 is formed with a series of spaced apart rings 51b, such rings being secured to supporting rods 54 in any suitable manner, as by welding, so that the rings are securely maintained in desired spaced relation to one another. The rings may be of round or flat stock, and if of round stock, should preferably be flattened upon their upper face to permit the bulk material to move radially in layer arrangement thereover as in the other forms of the invention. The spacing of the rings may vary as desired to provide for screening and sizing of the bulk material deposited on support 51 from hopper 50. In the form shown, the inmost five rings 51b are uniformly spaced from one another, but the spacing is closer than the spacing between the outer five rings 51b. Beneath support 51 and in spaced relation to rods 54 supporting the same are a series of funnels conforming in number to the sizes into which the bulk material is to be divided by the spacing of the radially disposed annular apertures between rings 51b of support 51. In the form shown there are three funnels, but these funnels are in nested arrangement rather than in circumferential arrangement as in Figs. 3 and 4. The inmost funnel 60 conforms in extent to the narrow spacing of the five inmost rings 51b and will receive the finest material falling through support 51, which material will be conducted by pipe 61 from the lower end of funnel 60 through an opening in wall 56 and into a suitable receptacle such as 62. Outwardly of funnel 60 is a funnel 64 which will receive the coarser material falling through the spaces between outer rings 51b of support 51 and will conduct the same through pipe 65 extending through an opening in wall 56 and deliver the same into a suitable receptacle such as 66. The larger sizes of the bulk material which have not fallen through the annular apertures between rings 51b of support 51 will fall over the edge of the support into funnel 68, which will direct the same through extension 69 into a suitable receptacle 70. By locating the annular wall 56 of this apparatus upon a foundation adjacent to heavy machinery such as a rock crusher, coal tipple, generating equipment, etc., which will cause the foundation of the apparatus to vibrate, it is unnecessary to provide special means for vibration of support 51, as has been done in the forms of the invention previously described. The vibratory effect, however, must be sufficient to lift the larger individual pieces of the material out of the slots between spaced rings 51b so that they may move radially without halting such movement other than momentarily to effect screening.

From the above it will be apparent that the present invention is capable of many forms and uses in the handling of bulk material. By securing hopper and support together in fixed relation as in the modifications shown in Figs. 3 and 6, the spacing of the mouth of the hopper from the support can be fixedly maintained. Such an arrangement is preferable since it avoids crushing or binding and wedging of the bulk material under the edge of the hopper as the material is fed from the hopper onto the support, a condition which sometimes occurs when the hopper is mounted independently of the support and thus not maintained in definite fixed spacial relation, as in the form shown in Fig. 2. Portable apparatus of the general type shown in Fig. 3 is extremely convenient and has wide utility wherever large containers and storage vessels including the holds of ships are to be filled quickly with discrete materials and where speed of loading is obtained by proper distribution throughout an extensive loading area concomitantly with the entry of the material. Any gaseous medium sent through the bulk material to clean the latter is by preference sent in a direction to contribute to the vibratory movement of the material. While not shown on the drawings, resilient means, such as springs, rubber buffers, blocks, wear plates, etc. may be utilized, as desired or required, to accelerate, to modulate, to smooth out or otherwise to improve or to control the vibratory movement of the support, or to reduce wear and friction.

While the invention has been herein shown and described in what are now considered to be preferred forms thereof, it is to be understood that the invention is not limited to specific details of process and apparatus herein set forth but covers all changes, modifications and adaptations within the scope of the appended claims.

I claim as my invention:

1. Apparatus for handling bulk material in the form of a plurality of discrete particles, said apparatus comprising a support providing a horizontal perforated surface, means spaced from said horizontal surface for feeding the material upon said surface, means for vibrating the support to cause the material to move over the horizontal surface in a layer of substantially uniform thickness, the thickness of the layer of material being controlled by the spacing between the feeding means and the horizontal surface, and means for directing a flow of elastic fluid upwardly through the perforations in the surface and through the layer of material on the surface, said flow directing means including a skirt extending downwardly from and enclosing the lower side of the support and an impeller positioned within said skirt, said vibrating means being provided by eccentricity in the impeller rotor structure.

2. Apparatus for handling bulk material in the form of a plurality of discrete particles, said apparatus comprising a support providing a perforated horizontal surface, means spaced from said horizontal surface for feeding the material centrally upon said surface, means for vibrating the support to cause the material to move radially outwardly over the horizontal surface in a layer of substantially uniform thickness and to cause at least some of the material to pass over the edge of the support, the thickness of the layer of material being controlled by the spacing between the feeding means and the horizontal surface, and means for directing a flow of elastic fluid upwardly through the layer of material on the perforated horizontal surface, said flow directing means including an impeller affixed to said support and said vibrating means being provided by eccentricity in the impeller rotor structure.

References Cited in the file of this patent

UNITED STATES PATENTS

| | | |
|---|---|---|
| 148,229 | Mayers | Mar. 3, 1874 |
| 204,454 | Russel | June 4, 1878 |
| 886,484 | Edwards | May 5, 1908 |
| 1,145,301 | Frantzen | July 6, 1915 |
| 1,695,369 | Davis | Dec. 18, 1928 |
| 1,923,200 | Hedberg | Aug. 22, 1933 |
| 1,977,479 | Hebley et al. | Oct. 16, 1934 |
| 2,049,870 | Schiff | Aug. 4, 1937 |
| 2,297,700 | Hinkle | Oct. 6, 1942 |
| 2,367,478 | Wiesbach | Jan. 16, 1945 |
| 2,544,576 | Weber | Mar. 6, 1951 |
| 2,547,794 | Stone | Apr. 3, 1951 |

FOREIGN PATENTS

| | | |
|---|---|---|
| 48,424 | Holland | May 15, 1940 |